United States Patent
Kim et al.

(10) Patent No.: US 10,614,295 B2
(45) Date of Patent: Apr. 7, 2020

(54) DEVICE FOR RECOGNIZING FACIAL EXPRESSION AND METHOD THEREOF

(71) Applicant: INDUSTRY-ACADEMIC COOPERATION FOUNDATION, YONSEI UNIVERSITY, Seoul (KR)

(72) Inventors: Shi Ho Kim, Seoul (KR); Jae Kwang Cha, Yongin-si (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 30 days.

(21) Appl. No.: 15/609,637

(22) Filed: May 31, 2017

(65) Prior Publication Data
US 2017/0344812 A1 Nov. 30, 2017

(30) Foreign Application Priority Data
May 31, 2016 (KR) .......................... 10-2016-0067282

(51) Int. Cl.
*G06K 9/00* (2006.01)
*G01J 1/42* (2006.01)
(Continued)

(52) U.S. Cl.
CPC ............ *G06K 9/00302* (2013.01); *G01J 1/42* (2013.01); *G01S 17/08* (2013.01); *G06F 3/012* (2013.01);
(Continued)

(58) Field of Classification Search
CPC ... G06K 9/00302; G06K 9/00255; G01J 1/42; G01S 17/08; G06F 3/012; G01B 11/16
See application file for complete search history.

(56) References Cited

U.S. PATENT DOCUMENTS

| 8,463,006 B2* | 6/2013 | Prokoski ............. A61B 5/0064 382/128 |
| 2007/0047768 A1* | 3/2007 | Gordon ............. G06K 9/00255 382/103 |
| 2010/0278385 A1* | 11/2010 | Song ................. G06K 9/00308 382/103 |

FOREIGN PATENT DOCUMENTS

| JP | 5362357 B2 | 12/2013 |
| JP | 2014-056576 A | 3/2014 |

(Continued)

OTHER PUBLICATIONS

Korean Office Action for Application No. 10-2016-0067282 dated Apr. 7, 2017.

*Primary Examiner* — Wing H Chow
(74) *Attorney, Agent, or Firm* — Sughrue Mion, PLLC

(57) ABSTRACT

Disclosed are a device for recognizing a facial expression and a method thereof. In accordance with an embodiment of the present invention, the device for recognizing a facial expression includes a storage unit for storing facial expression information; at least one light emitting part for emitting infrared rays (IR) to at least one object of a face of a user wearing the wearable headset device; at least one light receiving part for receiving infrared rays related to a correlation with the at least one object; an information collection unit for collecting intensity information from the received infrared rays; a transmission characteristic determination unit for determining transmission characteristic change in the received infrared rays based on the intensity information; a deformation of skin measurement unit for measuring deformation of skin for the at least one object based on the intensity information and the transmission characteristic change; and a facial expression recognition unit for recognizing a facial expression by comparing the deformation of skin with the facial expression information.

16 Claims, 8 Drawing Sheets

(51) Int. Cl.
*G06F 3/01* (2006.01)
*G01S 17/08* (2006.01)
*G01B 11/16* (2006.01)

(52) U.S. Cl.
CPC .......... *G06K 9/00255* (2013.01); *G01B 11/16* (2013.01)

(56) References Cited

FOREIGN PATENT DOCUMENTS

| | | |
|---|---|---|
| KR | 10-2011-0028922 A | 3/2011 |
| KR | 10-2012-0105282 A | 9/2012 |
| KR | 10-2016-0024725 A | 3/2016 |
| KR | 10-2017-0021188 A | 2/2017 |
| WO | 2007/025300 A2 | 3/2007 |

* cited by examiner

● LIGHT EMITTING PART
○ LIGHT RECEIVING PART

FIG. 8A
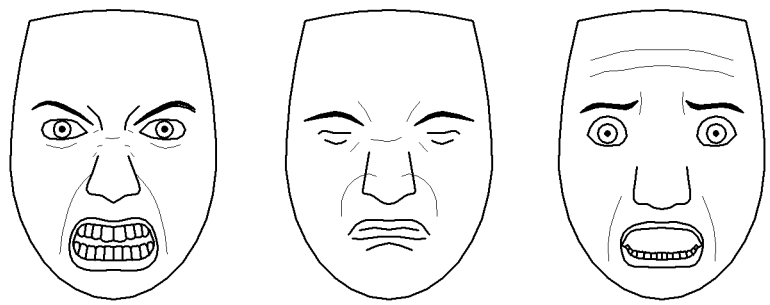
ANGER  DISGUST  FEAR
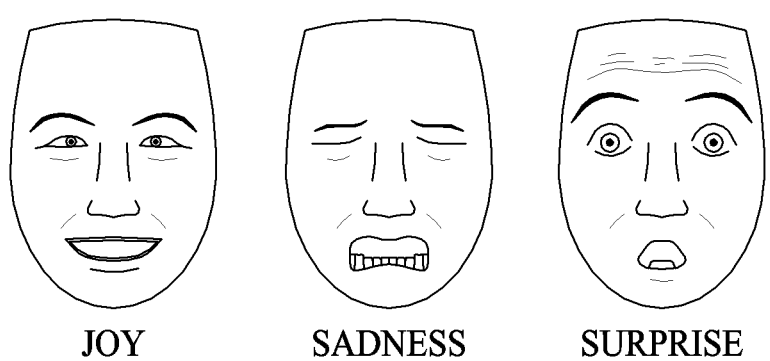
JOY  SADNESS  SURPRISE
FIG. 8B

DEVICE FOR RECOGNIZING FACIAL EXPRESSION AND METHOD THEREOF

CROSS-REFERENCE TO RELATED APPLICATION

This application claims the priority benefit of Korean Patent Application No. 10-2016-0067282, filed on May 31, 2016 in the Korean Intellectual Property Office, the disclosure of which is incorporated herein by reference.

BACKGROUND OF THE DISCLOSURE

Field of the Disclosure

The present invention relates to a device for recognizing a facial expression and a method thereof.

Description of the Related Art

Recently, various types of electronic devices such as a mobile communication terminal, a smart phone, a tablet Personal Computer (PC), a PDA (Personal Digital Assistant), an electronic notebook, a notebook, and a wearable device are widely used with the development of digital technology. Wearable devices are reaching a mobile convergence stage wherein functions of other types of devices are being implemented in wearable devices.

In addition, virtual reality technology, as an interface between a human and a computer which creates a specific environment or situation as stereoscopic 3D content through a computer and thus allows a person experiencing the 3D content to interact with a virtual surroundings or environment, is being introduced. A wearable headset device is an example of a wearable device. A wearable headset device can be used for virtual reality.

In addition, as mobile smart devices including wearable devices are widely used, technologies for a user interface supporting user manipulation of a mobile smart device are being introduced and technologies for a user interface to recognize or distinguish a facial expression of a user based on signals or information obtained from a face of the user are introduced.

When a user wears a wearable device on their face as an application form of virtual reality technology, research into recognition of the user wearing the wearable device is recognized as an important task.

In the case of a related technology, a face image of a user is captured using a camera to acquire image information, and the obtained image information is analyzed or signals generated from a face portion of the user are measured by means of an electromyography sensing unit.

However, in the case of a technique using a camera, there is a limitation that the camera should be installed at a predetermined distance spaced from a face of a user so as to recognize a facial expression of the user.

Accordingly, a wearable device such as smart glasses or a Head Mounted Display (HMD) device, which is worn closely to a user's face, is difficult to equip with a camera device.

In addition, in the case of a technology using an electromyography sensing unit, a plurality of electromyography sensing units should be attached to recognize a facial expression of a user because one electromyography sensing unit merely measures electromyogram change due to movement of a portion to which the electromyography sensing unit is attached.

Further, a related emotion recognition technology has a disadvantage in that an emotion recognition rate is decreased when a face is masked by a mask or the like and thus a camera cannot sense the entirety of the face.

RELATED DOCUMENTS

Patent Documents (Patent Document 1) Korean Patent Application Publication No. 10-2016-0024725 (published on Mar. 7, 2016), entitled "METHOD, SYSTEM AND NON-TRANSITORY COMPUTER-READABLE RECORDING MEDIUM FOR RECOGNIZING EXPRESSION"

(Patent Document 2) Japanese Patent Application Publication No. 2014-56576 (published on Mar. 27, 2014), entitled "GESTURE-AND EXPRESSION-BASED AUTHENTICATION"

(Patent Document 3) Japanese Patent No. 5362357 (registered on Sep. 13, 2013), entitled "PHOTOGRAPHING AND PROCESSING OF DATA FROM FACE MOTION"

SUMMARY OF THE DISCLOSURE

Therefore, the present invention has been made in view of the above problems, and it is one object of the present invention to provide a device for recognizing a facial expression, and a method thereof.

It is another object of the present invention to provide a device for emitting infrared rays to at least one object and/or receiving infrared rays from the at least one object and collecting intensity information, and a method thereof.

It is another object of the present invention to provide a device for determining change in transmission characteristics of infrared rays based on the intensity information, and a method thereof.

It is another object of the present invention to provide a device for measuring deformation of skin for at least one object based on the transmission characteristic change, and a method thereof.

It is another object of the present invention to provide a device for recognizing a facial expression by comparing deformation of skin with facial expression information, and a method thereof.

It is another object of the present invention to provide a device for determining transmission characteristic change in infrared rays using a distance between at least one light emitting part and at least one light receiving part, and a method thereof.

It is another object of the present invention to provide a device for measuring contractions and/or dilations of at least one object by comparing infrared ray intensity information with a reference value, and a method thereof.

It is yet another object of the present invention to provide a device for recognizing a facial expression by mapping deformation of skin to coordinates of at least one object and a method thereof.

In accordance with an aspect of the present invention, the above and other objects can be accomplished by the provision of a wearable headset device for recognizing a facial expression, including: a storage unit for storing facial expression information; at least one light emitting part for emitting infrared rays (IR) to at least one object of a face of a user wearing the wearable headset device; at least one light receiving part for receiving infrared rays related to a correlation with the at least one object; an information collection unit for collecting intensity information from the received infrared rays; a transmission characteristic determination unit for determining transmission characteristic change in the received infrared rays based on the intensity information; a deformation of skin measurement unit for measuring deformation of skin for the at least one object based on the intensity information and the transmission characteristic change; and a facial expression recognition unit for recognizing a facial expression by comparing the level or magnitude of the deformation of skin with preinclined reference data of the facial expression.

In accordance with another aspect of the present invention, there is provided a method of operating a wearable headset device for recognizing a facial expression, the method including: emitting infrared rays (IR) to at least one object; receiving infrared rays related to a correlation with the at least one object; collecting intensity information from the received infrared rays; determining transmission characteristic change in the received infrared rays based on the intensity information; measuring deformation of skin for the at least one object based on the intensity information and the transmission characteristic change; and recognizing a facial expression by comparing the level or magnitude of the deformation of skin with preinclined reference data of the facial expression.

BRIEF DESCRIPTION OF THE DRAWINGS

The above and other objects, features and other advantages of the present disclosure will be more clearly understood from the following detailed description taken in conjunction with the accompanying drawings, in which:

FIGS. 8A and 8B illustrate examples of facial expressions recognized by a wearable headset device according to an embodiment of the present invention.

DETAILED DESCRIPTION OF THE DISCLOSURE

Figure 1:
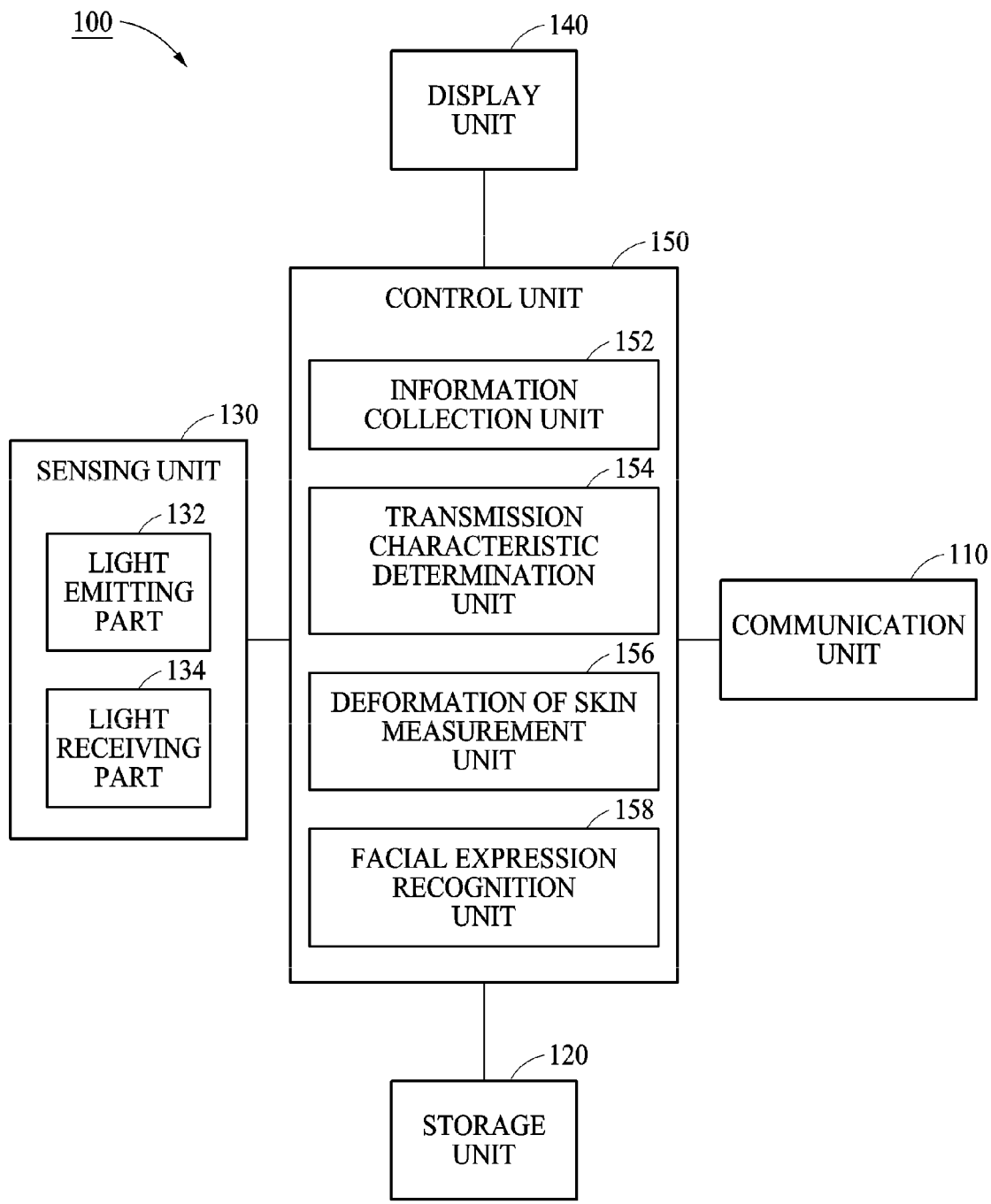
FIG. 1 illustrates the configuration of a wearable headset device according to an embodiment of the present invention.

The present invention will now be described more fully with reference to the accompanying drawings, in which exemplary embodiments of the invention are shown. This invention, however, should not be construed as limited to the exemplary embodiments and terms used in the exemplary embodiments, and should be understood as including various modifications, equivalents, and substituents of the exemplary embodiments.

Preferred embodiments of the present invention are now described more fully with reference to the accompanying drawings. In the description of embodiments of the present invention, certain detailed explanations of related known functions or constructions are omitted when it is deemed that they may unnecessarily obscure the essence of the invention. In addition, the terms used in the specification are defined in consideration of functions used in the present invention, and can be changed according to the intent or conventionally used methods of clients, operators, and users. Accordingly, definitions of the terms should be understood on the basis of the entire description of the present specification.

In the drawings, like reference numerals in the drawings denote like elements. As used herein, the singular forms "a," "an" and "the" are intended to include the plural forms as well, unless context clearly indicates otherwise. Expressions such as "A or B" and "at least one of A and/or B" should be understood to include all possible combinations of listed items. Expressions such as "a first," "the first," "a second" and "the second" may qualify corresponding components irrespective of order or importance and may be only used to distinguish one component from another component without being limited to the corresponding components. In the case in which a (e.g., first) component is referred as "(functionally or communicatively) connected" or "attached" to another (e.g., second) component, the first component may be directly connected to the second component or may be connected to the second component via another component (e.g., third component).

In the specification, the expression " . . . configured to . . . (or set to)" may be used interchangeably, for example, with expressions, such as " . . . suitable for . . . ," " . . . having ability to . . . ," " . . . modified to . . . ," " . . . manufactured to . . . ," " . . . enabling to . . . ," or " . . . designed to . . . ," in the case of hardware or software depending upon situations. In any situation, the expression "a device configured to . . . " may refer to a device configured to operate "with another device or component." For examples, the expression "a processor configured (or set) to execute A, B, and C" may refer to a specific processor performing a corresponding operation (e.g., embedded processor), or a general-purpose processor (e.g., CPU or application processor) executing one or more software programs stored in a memory device to perform corresponding operations.

In various embodiments, the wearable headset device may be a portable electronic device. Alternatively, the wearable headset device may be one of a smartphone, a portable terminal, a mobile phone, a mobile pad, a media player, a tablet computer, a handheld computer, a Head Mounted Display (HMD), or a Personal Digital Assistant (PDA). In addition, the wearable headset device may be a device having a combination of functions of two or more of the devices.

FIG. 1 illustrates a block diagram of a wearable headset device according to an embodiment of the present invention. FIG. 1 illustrates an embodiment of the constitution of a wearable headset device 100. Hereinafter, expressions such as " . . . unit" and " . . . part" refer to a unit processing at least one function or operation that may be implemented by hardware or software or a combination thereof.

Referring to FIG. 1, the wearable headset device 100 includes a communication unit 110, a storage unit 120, a sensing unit 130, a display unit 140, and a processor 150. The sensing unit 130 includes a light emitting part 132 and a light receiving part 134. The processor 150 includes an information collection unit 152, a transmission characteristic determination unit 154, a deformation of skin measurement unit 156, and a facial expression recognition unit 158.

The communication unit 110 provides an interface for performing communication with other electronic devices on the network. For example, the communication unit 110 converts a bit string transmitted to other electronic devices into a physical signal and converts a physical signal received from other electronic devices into a bit string. For example, other electronic devices may be wearable devices worn by another user.

The communication unit 110 may include different communication modules for processing signals of different frequency bands. For example, different communication standards may include Bluetooth Low Energy (BLE), Wireless Fidelity (Wi-Fi), WiFi Gigabyte (WiGig), cellular network (e.g., Long Term Evolution, LTE), and the like. In addition, the different frequency bands may include a Super High Frequency (SHF, e.g., 2.5 GHz, 5 Ghz) band and a millimeter wave (e.g., 60 GHz) band.

The communication unit 110 according to an embodiment may transmit at least one of intensity information, transmission characteristic change, and deformation of skin, which are obtained from infrared rays related to at least one object, to at least one different electronic device. For example, the at least one object may include an area around the eyes, an area around the mouth, an area around the cheek, and a whole area of the face of a user of the wearable headset device 100.

The communication unit 110 according to an embodiment may share intensity information, transmission characteristic change, and deformation of skin, which are obtained from infrared rays related to at least one object, with at least one different electronic device.

The communication unit 110 according to an embodiment transmits information on a facial expression recognized by the facial expression recognition unit 158 to at least one different electronic device, thereby sharing the information on the facial expression with the at least one different electronic device.

The communication unit 110 according to an embodiment may receive a sharing request for facial expression information from at least one different electronic device.

The communication unit 110 according to an embodiment may transmit facial expression information stored in the storage unit 120 to at least one different electronic device.

The communication unit 110 according to an embodiment may receive information on an emotion and a facial expression of a user of at least one different electronic device from the at least one different electronic device.

As described above, the communication unit 110 transmits and receives a signal. Accordingly, the communication unit 110 may be referred to a transmission unit, a reception unit, or a transmission and reception unit. In addition, in the following description, transmission and reception performed through a wireless channel include the aforementioned process by the communication unit 110.

The storage unit 120 may include volatile and/or non-volatile memory. The storage unit 120 may store a command or data related to at least one different component of the wearable headset device 100.

In accordance with an embodiment, the storage unit 120 may store software and/or a program. For example, the program may include a kernel, a middleware, an application programming interface, an application program, etc.

At least portion of a kernel, middleware, or an Application Interface (API) may be referred to as an operating system. For example, a kernel may control or manage system resources (bus, processor, or memory) used to execute operations or functions implemented by other programs (e.g., middleware, API, or application program).

In addition, a kernel may provide an interface capable of controlling or managing system resources by accessing an individual component of the wearable headset device 100 in a middleware, an API, or an application program. For example, the wearable headset device 100 includes a head Mounted Display (HMD).

The storage unit 120 according to an embodiment of the present invention may store intensity information collected from infrared rays related to a correlation with at least one object, transmission characteristic change determined by the transmission characteristic determination unit 154, deformation of skin measured by the deformation of skin measurement unit 156, and information on a facial expression recognized by the facial expression recognition unit 158.

The storage unit 120 according to an embodiment of the present invention may store information on received infrared rays in association with each other based on a correlation between at least one of objects and the same object. For example, the storage unit 120 may designate and store information of an object and infrared rays as a group.

The storage unit 120 according to an embodiment of the present invention may store at least one facial expression pattern determined based on at least one of infrared ray intensity information, transmission characteristic change, and deformation of skin related to at least one object.

The storage unit 120 stores data, such as a basic program, an application program, and setting information, for operation of the wearable headset device 100. In particular, the storage unit 120 may store at least one command set (e.g., application) for managing files according to various embodiments. At least one command set stored in the storage unit 120 may be executed by the processor 150. In addition, the storage unit 120 provides stored data according to a request of the processor 150. The storage unit 120 is included in the wearable headset device 100 and may be referred to as an "internal storage unit" or "internal storage unit device."

The sensing unit 130 may measure a physical quantity or sense operation state of the wearable headset device 100, and thus, may convert measured or sensed information into an electrical signal. For example, the sensing unit 130 may include at least one of a gesture sensing unit, a gyro sensing unit, an air pressure sensing unit, a magnetic sensing unit, an acceleration sensing unit, a grip sensing unit, a proximity sensing unit, a color sensing unit, a biosensing unit, a temperature/humidity sensing unit, an illuminance sensing unit, an ultraviolet (UV) sensing unit, an electromyography sensing unit, and an infrared sensing unit. The sensing unit 130 may further include a control circuit for controlling at least one sensing unit.

In an embodiment, a processor configured to control the sensing unit 130 is further included either as a portion of the processor 150 of the wearable headset device 100 or separately from the processor 150 to control the sensing unit 130 when the processor 150 is in a sleep or idle state.

The sensing unit 130 further includes the light emitting part 132. The light emitting part 132 according to an embodiment of the present invention may emit infrared rays to at least one object. For example, the light emitting part 132 emits infrared rays, in a horizontal direction, to at least one object. Here, infrared rays emitted in a horizontal direction may be horizontally diffused on a surface of at least one object. For example, the light emitting part 132 may be referred to as an infrared ray emitting part, an infrared ray radiation part, an infrared light emitting part, a light source, an infrared ray input device, a first sensing unit, or a first infrared ray sensing unit.

The light emitting part 132 according to an embodiment may be constituted of an infrared Light Emitting Diode (LED). For example, the light emitting part 132 may be constituted of an infrared LED module including a plurality of infrared LEDs. For example, LED may include at least one of Organic Light Emitting Diode (OLED), Active Matrix Organic Light Emitting Diode (AMOLED), and Flexible LED (FLED).

The light emitting part 132 according to an embodiment may perform at least one of an operation of sequentially emitting infrared rays to at least one object, an operation of emitting a group unit of infrared rays to at least one object, and an operation of simultaneously emitting infrared rays to at least one object. For example, when the light emitting part 132 sequentially emits infrared rays to at least one object, a plurality of light emitting parts 132 sequentially emit infrared rays one by one. For example, when the light emitting parts 132 emit, in a group unit, infrared rays to at least one object, group units of light emitting parts 132, which are designated as two or three groups, of a plurality of the light emitting parts 132 emit infrared rays in a designated order. For example, when the light emitting part 132 simultaneously emits infrared rays, a plurality of the light emitting parts 132 simultaneously emits infrared rays.

The sensing unit 130 includes the light receiving part 134. The light receiving part 134 according to an embodiment may sense infrared rays reflected by at least one object. For example, the light receiving part 134 may be referred to as infrared ray reception unit, an infrared ray sensing unit, an infrared ray acquisition unit, an infrared ray reception device, a second sensing unit, or a second infrared ray sensing unit.

The light receiving part 134 according to an embodiment may receive infrared rays related to at least one correlation when the plurality of light emitting parts 132 sequentially emit infrared rays, group units of the plurality of light emitting parts 132 emit infrared rays, or the plurality of light emitting parts 132 simultaneously emits infrared rays. For example, when the plurality of light emitting parts 132 sequentially emits infrared rays, group units of the plurality of light emitting parts 132 emit infrared rays, or the plurality of light emitting parts 132 simultaneously emit infrared rays, intensity information, transmission characteristic change, and deformation of skin included in received infrared rays may be changed.

The light emitting part 132 according to an embodiment may emit infrared rays to at least one object.

The light receiving part 134 according to an embodiment may receive infrared rays related to a correlation with at least one object. For example, the correlation includes at least one of reflection, diffusion, transmission, and refraction of infrared rays by at least one object.

The sensing unit 130 according to various embodiments may be installed at a portion of the wearable headset 100 which contacts a user's face.

The display unit 140 may output a command or data received from the processor 150 through an input/output device. The display unit 140 may be referred to as a user interface. For example, the display unit 140 may include a Liquid Crystal Display unit (LCD), a Light Emitting Diode (LED) display unit, an Organic Light Emitting Diode (OLED) display unit, or a microelectromechanical system (MEMS) display unit, or an electronic paper display unit.

For example, the display unit 140 may display unit various content for a user (e.g., texts, images, video, icons, symbols, etc.).

In addition, the display unit 140 includes an internal display unit and an external display unit. The internal display unit may be located inside an electronic device, and may process and display unit data stored in the storage unit 120 under control of the processor 150 of the electronic device. The internal display unit may process and display unit data, which is received from another electronic device, through the processor 150.

In accordance with an embodiment, the internal display unit may display unit content related to facial expression information of a user who uses another electronic device.

In accordance with an embodiment, the external display unit may display unit content related to facial expression information of a user who uses an electronic device. For example, the content may be images, videos, stickers, or the like.

The processor 150 may include a processor, a central processing unit, an application processor, or a communication processor. For example, the processor 150 may execute a calculation or data processing related to control and/or communication of at least one different component of the wearable headset device 100. For example, the processor 150 may control a plurality of hardware or software components connected to the processor 150 by driving an operating system or an application program and may perform various types of data processing and calculations. For example, the processor 150 may be implemented as a system on chip (SOC). The processor 150 may load a command or data received from at least one of other components (e.g., non-volatile memory) into a volatile memory, may process the command or data, and may store resultant data in a non-volatile memory.

The processor 150 includes the information collection unit 152, the transmission characteristic determination unit 154, the deformation of skin measurement unit 156, and the facial expression recognition unit 158.

In accordance with an embodiment, the processor 150 may control the communication unit 110, the storage unit 120, the sensing unit 130, and the display unit 140.

In accordance with an embodiment, the processor 150 may emit infrared rays to at least one object by controlling the light emitting part 132.

In accordance with an embodiment, the processor 150 may receive infrared rays related to a correlation with at least one object by controlling the light receiving part 134. The correlation may include reflection, transmission, diffusion, etc. of infrared rays.

In accordance with an embodiment, the processor 150 may sense infrared rays reflected by at least one object, and may recognize a facial expression of a user of the wearable headset device 100 based on the sensed infrared rays.

In accordance with an embodiment, the processor 150 may sense infrared rays reflected by at least one object, and may store information on the sensed infrared rays in the storage unit 120.

In accordance with an embodiment, the processor 150 may load the information (e.g., information on sensed infrared rays) stored in the storage unit 120.

In accordance with an embodiment, the processor 150 may determine change in information on sensed infrared rays by comparing information stored in the storage unit 120.

In accordance with an embodiment, the processor 150 may determine a facial expression pattern of a user wearing the wearable headset device 100 by comparing information stored in the storage unit 120.

In accordance with an embodiment, the processor 150 may store a facial expression pattern of a user of the wearable headset device 100 in the storage unit 120. For example, a facial expression pattern of a user may include sadness, joy, loneliness, boredom, anger, etc.

In accordance with an embodiment, the processor 150 may recognize a facial expression using a facial expression pattern stored in the storage unit 120.

In accordance with an embodiment, the information collection unit 152 may collect infrared ray intensity information that are received by at least one light receiving part and are related to a correlation with at least one object.

In accordance with an embodiment, the transmission characteristic determination unit 154 may determine transmission characteristic change in infrared rays based on infrared ray intensity information related with a correlation with at least one object.

In accordance with an embodiment, the transmission characteristic determination unit 154 may determine transmission characteristic change in infrared rays based on infrared ray intensity information and a distance between the light emitting part 132 and the light receiving part 134. For example, with regard to the transmission characteristic change in infrared rays, intensity information may be exponentially decreased when a distance between the light emitting part 132 and the light receiving part 134 is a specific distance (e.g., 1 to 2 mm).

In accordance with an embodiment, the deformation of skin measurement unit 156 may measure deformation of skin for at least one object based on intensity information on and transmission characteristic change in infrared rays that are received by the light receiving part 134. For example, the deformation of skin may include contraction or dilation information on a region between two spots of at least one object.

In accordance with an embodiment, the deformation of skin measurement unit 156 may measure deformation of skin for at least one object as dilation, when the light emitting part 132 and the light receiving part 134 are located at the same distance as the case in which a reference value is measured and infrared ray intensity information is greater than a reference value.

In accordance with an embodiment, the deformation of skin measurement unit 156 may measure deformation of skin for at least one object as contraction, when the light emitting part 132 and the light receiving part 134 are located at the same distance as the case in which a reference value is measured and infrared ray intensity information is less than a reference value.

In accordance with an embodiment, the facial expression recognition unit 158 may recognize a facial expression of a wearer of a wearable headset device by comparing deformation of skin measured by the deformation of skin measurement unit 156 with facial expression information stored in the storage unit 120.

For example, the facial expression recognition unit 158 may recognize the facial expression by comparing the level or magnitude of the deformation of skin with the preinclined reference data of the facial expression.

In accordance with an embodiment, the facial expression recognition unit 158 may recognize a facial expression by mapping deformation of skin, which is measured by the deformation of skin measurement unit 156, to coordinates of at least one object.

In accordance with an embodiment, the processor 150 may determine at least one facial expression pattern that is determined based on at least one of infrared ray intensity information, transmission characteristic change, and deformation of skin related to at least one object.

For example, the processor 150 may control the wearable headset device 100 to perform a procedure illustrated in FIG. 4, 5, 6, or 7 or the like.

Figure 2:
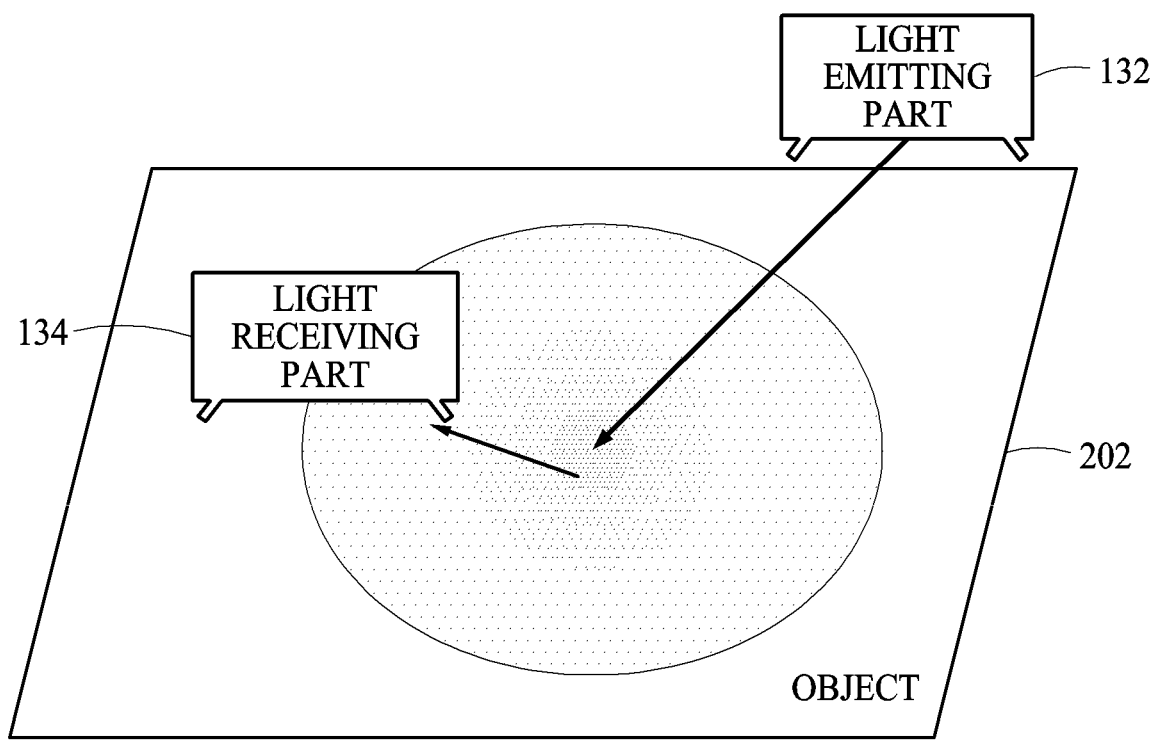
FIG. 2 illustrates an infrared ray transmission and reception procedure in a light emitting part and a light receiving part according to an embodiment of the present invention.

FIG. 2 illustrates an infrared ray transmission and reception procedure in a light emitting part and a light receiving part according to an embodiment of the present invention. Referring to FIG. 2, the light emitting part 132 emits infrared rays to an object 202, and the light receiving part 134 receives infrared rays related to a correlation with the object 202. For example, the object 202 may be the skin or skin surface of a user wearing a wearable headset device that includes the light emitting part 132 and the light receiving part 134. For example, the object 202 may be an area around the eyes, an area around the mouth, an area around the nose, or an area around the cheek of a user wearing an electronic device. For example, the correlation may include reflection, transmission, refraction, and diffusion of infrared rays.

For convenience of explanation, although one object, one light emitting part, and one light receiving part are described, the object may be at least one object and a wearable headset device may include a plurality of light emitting parts and the plurality of light receiving parts.

In an embodiment, the plurality of light emitting parts may respectively emit infrared rays to different objects, and the plurality of light receiving parts may respectively receive infrared rays reflected by different objects. For example, when the wearable headset device 100 includes the plurality of light emitting parts and the plurality of light receiving parts, one light emitting part of the plurality of light emitting parts and one sensing unit among a plurality of sensing units may be configured as a pair. For example, when an electronic device includes the plurality of light emitting parts and one light receiving part, the plurality of light emitting parts may respectively emit infrared rays to different objects, and one light receiving part may receive infrared rays reflected by each of the different objects.

The light emitting part 132 according to an embodiment may emit infrared rays to the object 202 along a horizontal direction. Infrared rays emitted by the light emitting part 132 may be horizontally or vertically diffused on the object 202. For example, infrared rays emitted by the light emitting part 132 may be transmitted to a specific layer (e.g., fat layer) of the object 202 and then may be delivered in a horizontal or vertical direction or in horizontal and vertical directions. Infrared rays emitted by the light emitting part 132 may be horizontally diffused on the object 202, and then may be reflected by the object 202.

The light receiving part 134 according to an embodiment receives infrared rays reflected by the object 202. The infrared rays reflected by the object 202 may include infrared ray intensity information that is changed according to a state of the object 202. For example, the infrared ray intensity information may be changed according to the density, contraction, expansion, thickness, or physical characteristics of the object 202. For example, the infrared ray intensity information may be referred to as light intensity.

In accordance with an embodiment, with regard to the infrared ray intensity information, the intensity of infrared rays is sensed to be lower than a reference value when density of the object 202 is high, and the intensity of infrared rays is sensed to be higher than a reference value when the density of the object 202 is low.

For example, with regard to the infrared ray intensity information, the intensity of infrared rays is measured to be lower than a reference value when the object 202 is contracted, and the intensity of infrared rays is measured to be higher than a reference value when the object 202 is relaxed.

The light receiving part 134 according to an embodiment may receive infrared rays that include information on the density, contraction degree, expansion degree, thickness degree, or physical characteristics of the object 202 using infrared rays reflected by the object 202.

The light emitting part 132 according to an embodiment emits infrared rays to the object 202 at least once, and the light receiving part 134 senses infrared rays reflected by the object 202 at least once. For example, when the light emitting part 132 emits infrared rays to the object 202 twice, the light receiving part 134 may receive infrared rays from the object 202 twice.

In accordance with an embodiment, the wearable headset device 100 emits infrared rays from the light emitting part 132 to the object 202, and then drives a timer to measure time. When the light receiving part 134 receives infrared rays reflected by the object 202, timer operation is stopped and time measurement is terminated. The wearable headset device uses the measured time to determine a state of the object 202. Here, examples of the state of the object 202 include the density, contraction degree, expansion degree, thickness degree, or physical characteristics of the object 202.

The light emitting part 132 according to an embodiment emits infrared rays to the object 202 in a first direction (e.g., z direction), and the infrared rays, which have been emitted in the first direction, are reflected by a fat layer locating at a lower part of the object 202 and delivered in a second direction (e.g., x direction) and a third direction (e.g., y direction). The infrared rays, which have been delivered in the second and third directions, may exhibit exponential properties. For example, the transmission characteristics of infrared rays may be changed according to contraction or dilation of the object 202. The wearable headset device 100 may determine transmission characteristic change and may calculate the object 202 as coordinates in first, second, and third directions. A facial expression of a wearer of the wearable headset device 100 may be recognized by mapping transmission characteristic change to the calculated first, second, and third directions.

Figure 3A:
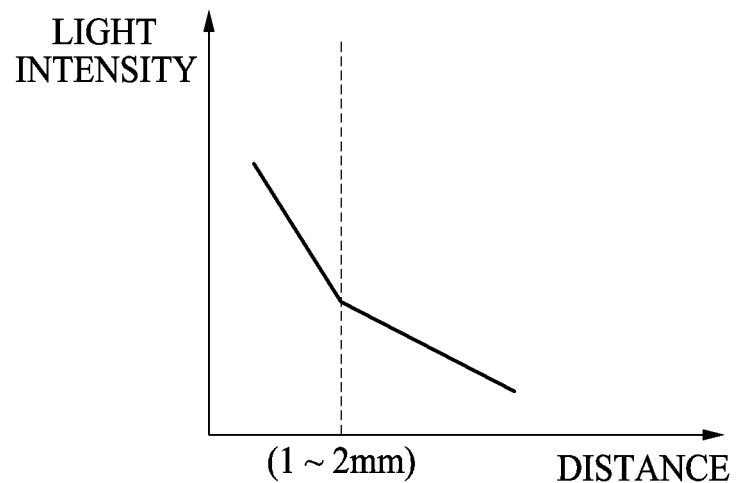
FIGS. 3A and 3B illustrate graphs showing transmission characteristics of a light emitting part and a light receiving part according to an embodiment of the present invention.
Figure 3B:
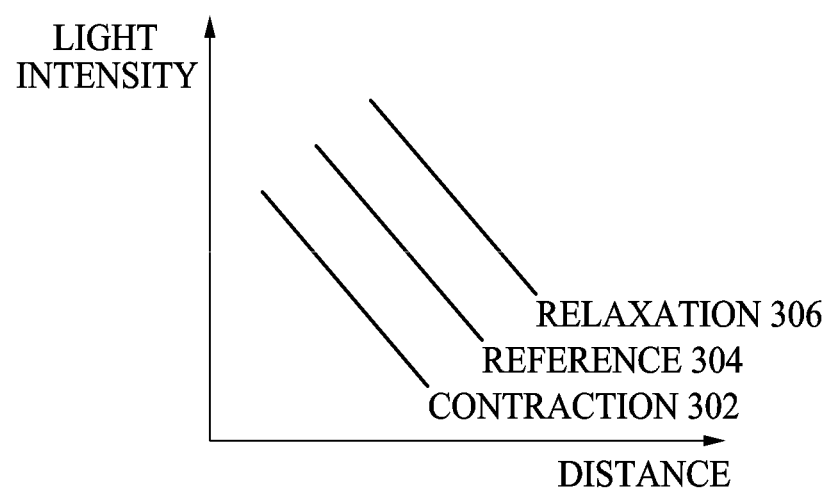

FIGS. 3A and 3B illustrate graphs showing transmission characteristics of the light emitting part and the light receiving part according to an embodiment of the present invention. FIG. 3A illustrates a graph showing infrared ray transmission characteristic changes of the light emitting part and the light receiving part dependent upon a distance between the light emitting part and the light receiving part, and FIG. 3B illustrates a graph showing dilation and contraction of an object when the light emitting part emits infrared rays and the light receiving part receives infrared rays related to a correlation with at least one object.

FIG. 3A illustrates a graph showing the transmission characteristics of infrared rays that are emitted from the light emitting part and are received by the light receiving part. Here, a horizontal axis represents a distance and a vertical axis represents infrared ray intensity information received by the light receiving part. Light intensity of infrared rays received by the light receiving part is decreased as a distance between the light emitting part and the light receiving part increases.

The infrared ray intensity information received by the light receiving part is decreased depending upon a distance between the light emitting part and the light receiving part. When the light receiving part receives infrared rays related to a correlation with an object, the infrared ray intensity information may be exponentially changed depending upon a distance between the light emitting part and the light receiving part.

For example, when a distance between the light emitting part emitting infrared rays and the light receiving part receiving infrared rays that are related to a correlation with an object has a specific value (e.g., 1 to 2 mm), the intensity of infrared rays received by the light receiving part may be exponentially decreased.

For example, referring to FIG. 3B, a horizontal axis represents a distance between the light emitting part and the light receiving part, and a vertical axis represents the intensity of infrared rays that are emitted from the light emitting part and are received by the light receiving part.

When light intensity of infrared rays received by the light receiving part is lower than the reference 304, an object is represented as contraction 302. On the other hand, when light intensity is higher than the reference 304, an object is represented as dilation 306.

The wearable headset device 100 including the light emitting part and the light receiving part may measure the contraction 302 or dilation 306 of an object from light intensity change in infrared rays that are received by the light receiving part.

In accordance with an embodiment, the wearable headset device 100 may determine skin contraction and dilation degrees of each portion of the face by mapping information on the contraction 302 or dilation 306 of an object to coordinates of a corresponding portion of the face.

In accordance with an embodiment, the wearable headset device 100 may recognize a facial expression of a wearer of the wearable headset device 100 in real time by determining skin contraction and dilation degrees of each portion of the face.

Figure 4:
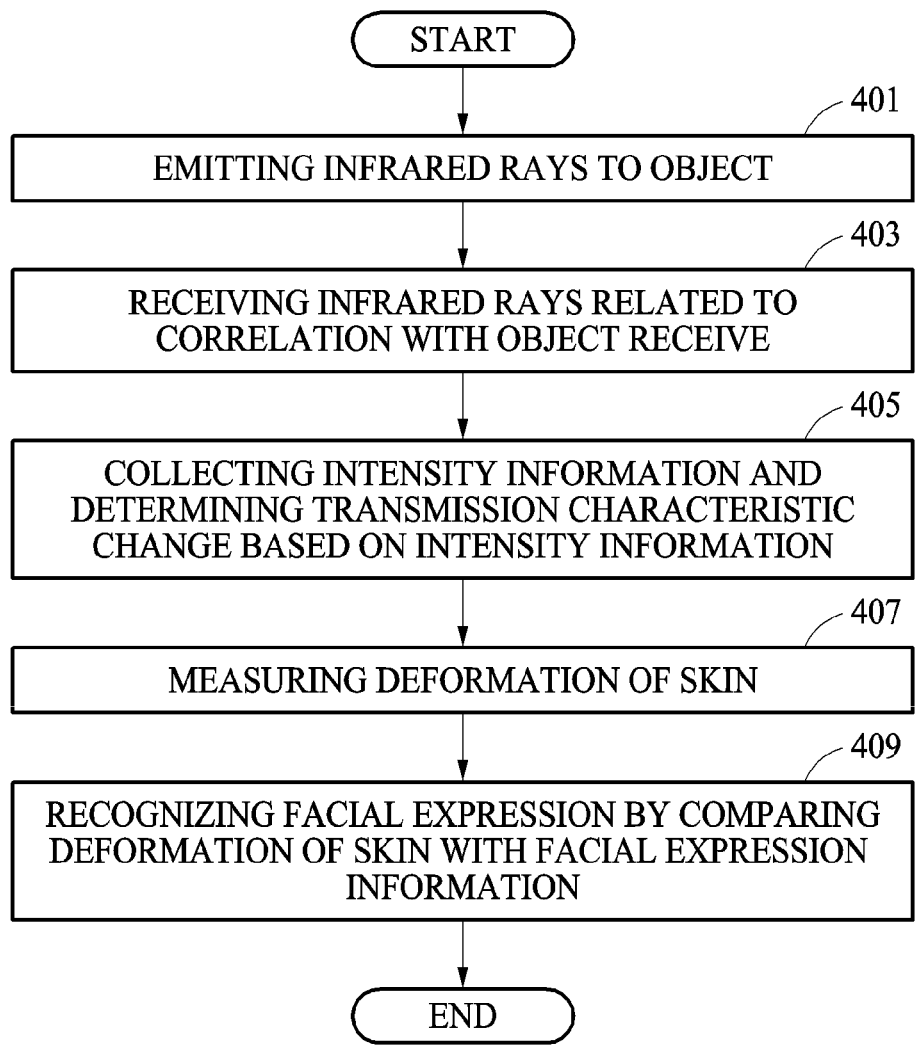
FIG. 4 illustrates a facial expression recognition procedure of a wearable headset device according to an embodiment of the present invention.

FIG. 4 illustrates a facial expression recognition procedure of the wearable headset device according to an embodiment of the present invention. FIG. 4 illustrates a procedure characterized by obtaining information of an object using the light emitting part and light receiving part of the wearable headset device 100 and recognizing a facial expression by comparing the obtained object information with information stored in a storage unit.

Referring FIG. 4, in step 401, the wearable headset device 100 emits infrared rays to an object. The wearable headset device 100 controls the light emitting part to emit infrared rays to at least one object. For example, the light emitting part may include a plurality of light emitting parts. The plurality of light emitting parts may sequentially emit infrared rays to at least one object. Alternatively, at least one light emitting part among the plurality of light emitting parts is designated as a group unit and the group unit may emit infrared rays to at least one object. Alternatively, the plurality of light emitting parts may simultaneously emit infrared rays to at least one object. For example, the at least one object includes the skin, an area around the eyes, an area around the nose, an area around the mouth, an area around the cheek, and/or a whole face area of a wearer of the wearable headset device 100. For example, infrared rays emitted from the light emitting part may be transmitted in a first direction (e.g., z direction) on a surface of an object and delivered in a second direction (x direction) and a third direction (y direction), followed by being received by the light receiving part. Infrared rays emitted from the light emitting part and received by the light receiving part may have transmission characteristics. For example, the transmission characteristics of infrared rays may be changed based on light intensity of infrared rays received by the light receiving part and a distance between the light emitting part and the light receiving part.

In step 403, the wearable headset device 100 receives infrared rays related to a correlation with an object. The wearable headset device 100 receives infrared rays related to a correlation with an object, which corresponds to a portion to which the light emitting part emits infrared rays, by controlling the light receiving part. For example, the correlation may include light signal transmission characteristics, such as transmission, diffuse, reflection, refraction, etc. of infrared rays. For example, the wearable headset device 100 may include a light receiving part that corresponds to an object to which the light emitting part emits infrared rays. For example, the light receiving part may include a plurality of light receiving parts. The plurality of light receiving parts may receive infrared rays that are sequentially emitted from the plurality of light emitting parts. For example, the plurality of light receiving parts receives infrared rays when a first light emitting part among the plurality of light emitting parts emits infrared rays, and then receives infrared rays when a second light emitting part emits infrared rays, followed by receiving infrared rays when a $n^{th}$ light emitting part emits infrared rays. For example, the case in which the light receiving part receives infrared rays emitted from the first light emitting part and the case in which the light receiving part receives infrared rays emitted from the second light emitting part are related to a correlation with an object, and infrared ray transmission characteristics included in the infrared rays received by the light receiving part may be changed. For example, the plurality of light receiving parts may receive infrared rays that are emitted from light emitting parts, which are designated as a group unit, among the plurality of light emitting parts. For example, the plurality of light receiving parts may receive infrared rays simultaneously emitted from the plurality of light emitting parts. For example, the light receiving part may receive infrared rays related to a correlation with at least one object, and may deliver information on the received infrared rays to a processor.

In step 405, the wearable headset device 100 collects infrared ray intensity information, and determines transmission characteristic change based on the infrared ray intensity information. The wearable headset device 100 collects intensity information of infrared rays that are related to a correlation with at least one object by controlling an information collection unit. For example, the infrared ray intensity information may be different based on a correlation with at least one object. The wearable headset device 100 determines transmission characteristic change in infrared rays based on intensity information. The wearable headset device 100 determines transmission characteristic change in infrared rays based on intensity information of infrared ray related to a correlation with at least one object and a distance between the light emitting part and the light receiving part. For example, the transmission characteristic change may exponentially change when a distance between the light emitting part and the light receiving part is a specific distance (1 to 2 mm).

In step 407, the wearable headset device 100 measures deformation of skin. The wearable headset device measures deformation of skin for at least one object based on intensity information of infrared ray related to a correlation with at least one object and the transmission characteristic change determined in step 405 by controlling a deformation of skin measurement unit. For example, with regard to the wearable headset device 100, a distance between the light receiving part and the light emitting part are designated, the light emitting part emits infrared rays to an object at a designated location, the light receiving part receives infrared rays related to a correlation with an object, and light intensity information included in the received infrared rays is determined as a reference value. Subsequently, the light emitting part emits infrared rays to an object at a designated location, the light receiving part receives infrared rays related to a correlation with an object, an information collection unit collects infrared ray intensity information, a transmission characteristic determination unit determines transmission characteristic change in infrared rays, and a deformation of skin measurement unit compares the measured intensity information with a reference value. Depending upon comparison results, deformation of skin for an object is measured to be relaxed when the intensity information measured by the deformation of skin measurement unit is larger than a reference value, but deformation of skin for an object is measured to be contracted when the measured intensity information is smaller than a reference value. For example, the deformation of skin may include a contraction degree or dilation degree of an object. For example, the deformation of skin may be changed when the plurality of light emitting parts sequentially emits infrared rays, a group unit of the light emitting parts emits infrared rays, and the light emitting parts simultaneously emit infrared rays.

In step 409, the wearable headset device recognizes a facial expression by comparing the level or magnitude of the deformation of skin with preinclined reference data of the facial expression. The wearable headset device 100 recognizes a facial expression of a wearer of the wearable headset device 100 by controlling a facial expression recognition unit and thus by comparing the deformation of skin measured in step 407 with the facial expression information stored in the storage unit. For example, the facial expression information includes preinclined reference data of the facial expression. The facial expression information may be information indicating joy, disgust, anger, fear, surprise, etc., and may be coordinate information on the wearer' face. For example, the wearable headset device 100 may recognize a facial expression of a wearer by mapping deformation of skin to coordinates of the wearer' face.

Figure 5:
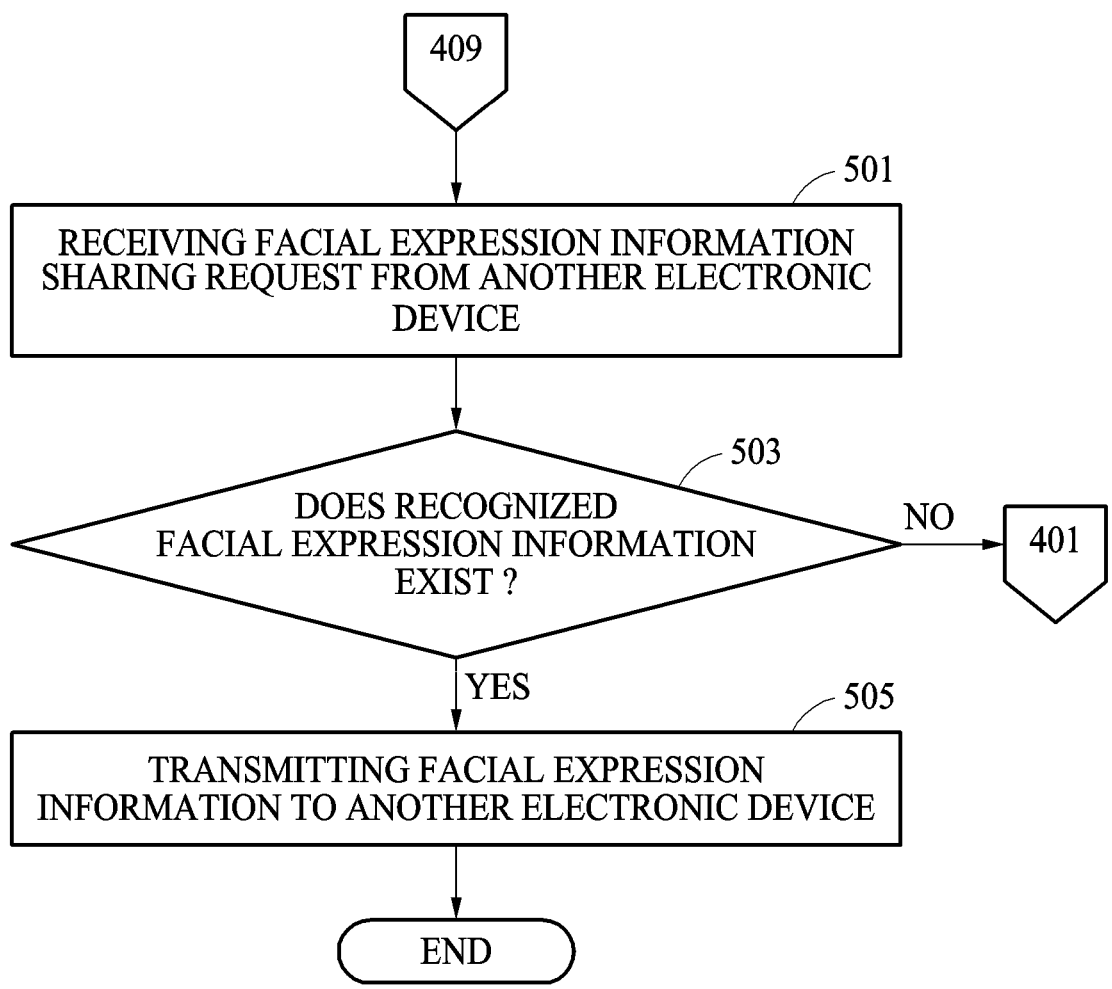
FIG. 5 illustrates a facial expression information sharing procedure of a wearable headset device according to an embodiment of the present invention.

FIG. 5 illustrates a facial expression information sharing procedure of the wearable headset device according to an embodiment of the present invention.

Referring to FIG. 5, in step 501 after step 409, the wearable headset device 100 receives a facial expression information sharing request from another electronic device. The wearable headset device 100 includes a communication unit for receiving a facial expression information sharing request from another electronic device. For example, when the wearable headset device 100 covers all of the user's face and thus a user of another electronic device (e.g., the other party) cannot recognize a facial expression of the user who wears the wearable headset device 100, the user of the another electronic device may transmit a facial expression information sharing request to the wearable headset device 100 so as to recognize a facial expression that indicates mode state of the user of the wearable headset device 100.

In step 503, the wearable headset device 100 determines the existence of recognized facial expression information. The wearable headset device 100 includes a processor for determining whether recognized information is present in a storage unit. In accordance with various embodiments, the processor may determine whether facial expression information of a user, which is determined within a predetermined time with respect to a reference time, is present in the storage unit. When the processor determines that facial expression information of a user, which is determined within a predetermined time with respect to a reference time, is not present, a process returns to step 401 so as to transmit facial expression information of a user to another electronic device. When the processor determines that user facial expression information, which is determined within a predetermined time, is present in the storage unit, step 505 is performed.

In step 505, the wearable headset device 100 transmits facial expression information to another electronic device. The wearable headset device 100 includes a communication unit for transmitting facial expression information to another electronic device. For example, the wearable headset device 100 may share facial expression information of a user of the wearable headset device 100 with another electronic device by transmitting the facial expression information to the electronic device. For example, the wearable headset device 100 may receive facial expression information of a user of the electronic device from the electronic device. For example, the wearable headset device 100 may share an emotion of a user of the electronic device by transmitting/receiving facial expression information to/from the electronic device and thus sharing facial expression information on the user of the electronic device without observing the face of the user of the electronic device.

Figure 6:
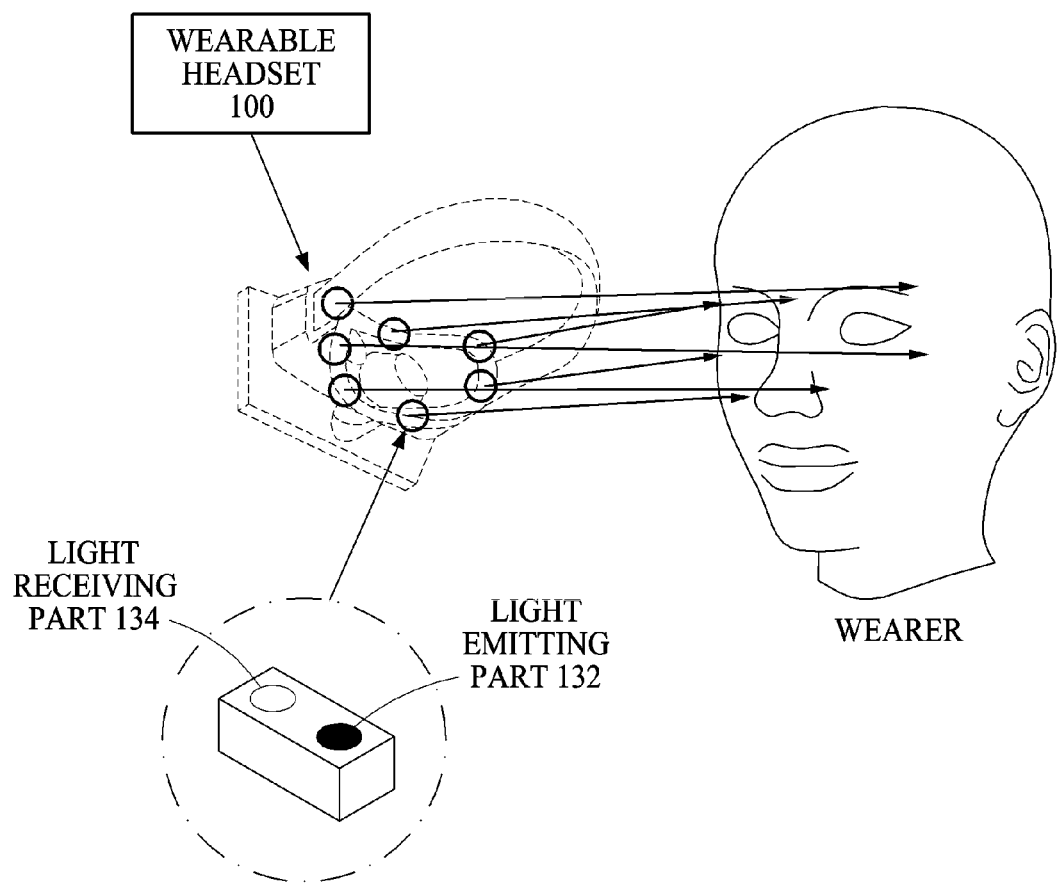
FIG. 6 illustrates arrangements of a light emitting part and a light receiving part in a wearable headset device according to an embodiment of the present invention.

FIG. 6 illustrates arrangements of the light emitting part and the light receiving part in the wearable headset device according to an embodiment of the present invention. FIG. 6 illustrates the case in which a user wears the wearable headset device 100, a plurality of sensing units are arranged on portions of the wearable headset device 100 which the user wears, and at least one object information is collected using infrared rays from at least one object included in the user.

Referring to FIG. 6, the wearable headset device 100 includes a sensing unit that includes the light emitting part 132 and the light receiving part 134. The sensing unit includes the light emitting part 132 and light receiving part 134 that are configured as a pair, and a plurality of sensing units are arranged on portions that correspond to parts worn by a user. Here, the corresponding portions may be areas around the eyes of the user. For example, with regard to the wearable headset device 100, light emitting parts 132 arranged on portions corresponding to parts that correspond to left sides of the eyes of the user emit infrared rays to the parts that correspond to left sides of the eyes, and light receiving parts 134 sense infrared rays reflected by the parts that correspond to left sides of the eyes. Infrared rays received by the light receiving part 134 include infrared ray intensity information. The infrared ray intensity information is changed according to the densities, dilation degrees, and contraction degrees of parts that correspond to left sides of the eyes of a user. For example, the wearable headset device 100 determines transmission characteristic change in infrared rays, depending upon infrared ray intensity information and a distance between the light emitting part and the light receiving part which are configured as a pair, through the transmission characteristic determination unit.

In accordance with an embodiment, the wearable headset device 100 may measure deformation of skin for an object based on the intensity of infrared rays received by the light receiving part 134 and transmission characteristic change in the infrared rays, and may recognize a facial expression of a user by comparing the measured deformation of skin with facial expression information stored in the storage unit.

In accordance with an embodiment, the wearable headset device 100 may recognize a facial expression of a user by combining information on areas around the eyes of the user. The wearable headset device 100 may determine a facial expression pattern according to infrared ray intensity information on areas around the eyes and may store the determined facial expression pattern in the storage unit. The wearable headset device 100 may recognize a facial expression of the user by comparing the facial expression pattern stored in the storage unit with information of infrared rays that are emitted by the light emitting part 132 and are received by the light receiving part 134.

In accordance with an embodiment, the wearable headset device 100 may recognize a facial expression of a user by arranging the sensing units on portions that correspond to areas around the eyes of a user wearing the wearable headset device 100, measuring deformation of skin based on infrared ray intensity information and infrared ray transmission characteristic change obtained from the areas around the eyes of the user, and by comparing the deformation of skin with facial expression information.

Figure 7:
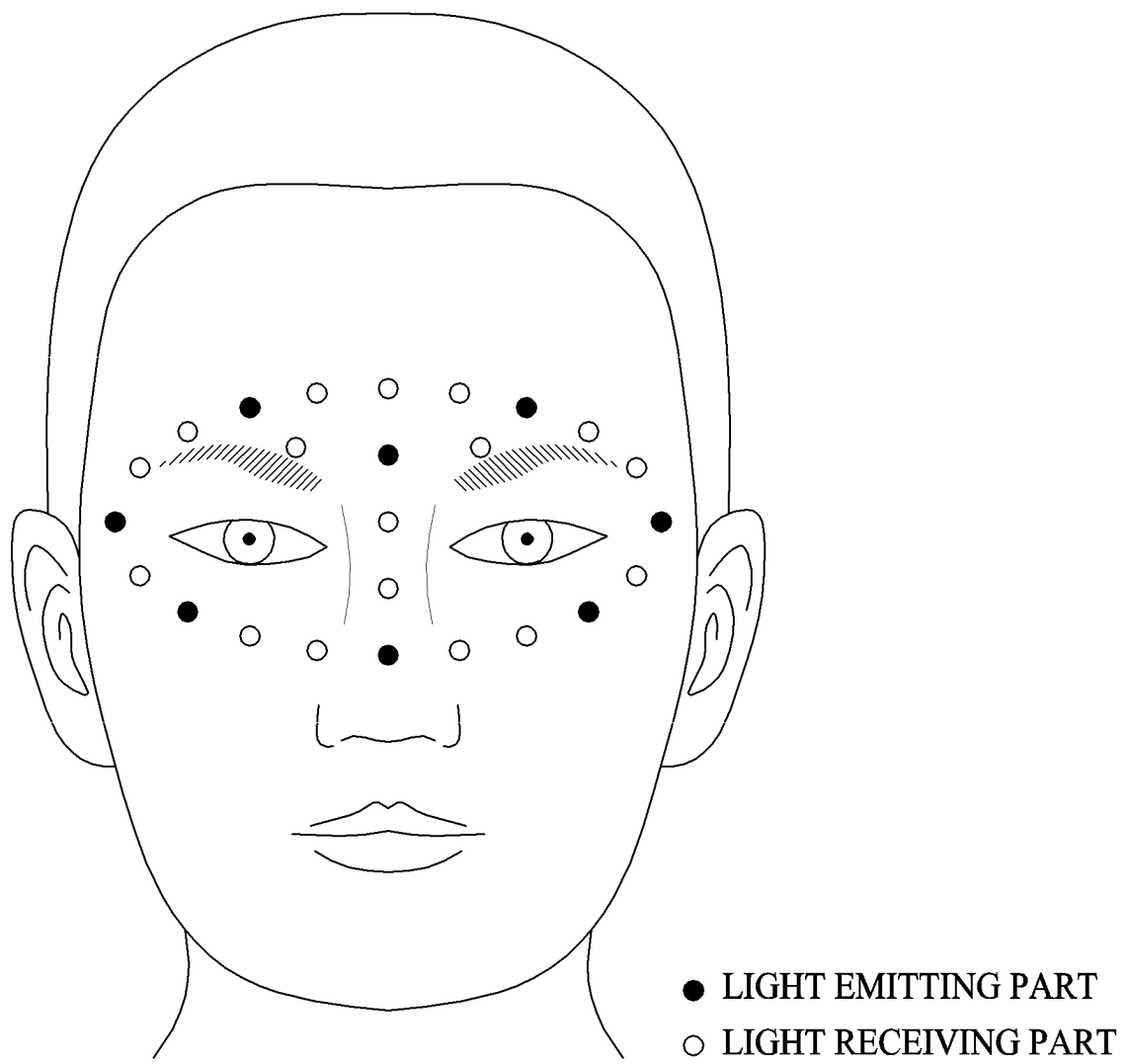
FIG. 7 illustrates arrangements of a light emitting part and a light receiving part in a wearable headset device according to another embodiment of the present invention.

FIG. 7 illustrates arrangements of the light emitting part and the light receiving part in the wearable headset device according to another embodiment of the present invention. FIG. 7 illustrates a wearable headset device wherein the plurality of light emitting parts and the plurality of light receiving parts are arranged on portions contacting the skin of a wearer and the arranged light emitting parts and light receiving parts are spaced from each other.

Referring to FIG. 7, the plurality of light emitting parts and the plurality of light receiving parts are arranged on the wearable headset device 100 to be corresponded to areas around the eyes of a user.

For example, the plurality of light emitting parts is respectively arranged on objects corresponding to areas around the eyes, and sequentially emits infrared rays one by one. The plurality of light receiving parts receives infrared rays related to a correlation with an object, which has received infrared rays, whenever one of the light emitting parts emits infrared rays. For example, one light emitting part may emit infrared rays and a plurality of light receiving parts may receive infrared rays.

For example, the plurality of light emitting parts are respectively arranged on objects corresponding to areas around the eyes and emit infrared rays in a group unit, and the plurality of light receiving parts receive the infrared rays that have been emitted in a group unit. For example, the group unit may include two light emitting parts or three light emitting parts and may be determined by a user of the wearable headset device 100 or a manufacturer of the wearable headset device 100. For example, the group unit may include one light emitting part or a combination of two, three, or more light emitting parts.

For example, the plurality of light emitting parts may be respectively arranged on objects corresponding to areas around the eyes and may simultaneously emit infrared rays, and the plurality of light receiving parts may simultaneously receive the emitted infrared rays.

For example, when the plurality of light emitting parts sequentially emit infrared rays one by one, emit infrared rays in a group unit, and simultaneously emit infrared rays, infrared ray intensity information measured may be changed. For example, when infrared ray intensity information is changed, transmission characteristics of infrared rays may also be changed.

For example, the transmission characteristics of infrared rays may be changed based on infrared ray intensity information received by the light receiving part and a distance between the light emitting part and the light receiving part. For example, changed infrared ray transmission characteristics may be referred to as change in transmission characteristics.

In accordance with an embodiment, the wearable headset device 100 may determine transmission characteristic change in infrared rays delivered from an object according to distances between the plurality of light emitting parts and the plurality of light receiving parts and infrared ray intensity information received by the plurality of light receiving parts.

In accordance with an embodiment, the wearable headset device 100 may measure deformation of skin indicating a tension degree of the skin of a wearer of the wearable headset device 100 using the plurality of light emitting parts and the plurality of light receiving parts.

In accordance with an embodiment, the wearable headset device 100 may emit infrared rays to objects corresponding to areas around the eyes of a wearer of the wearable headset device 100 by controlling the plurality of light emitting parts, may receive infrared rays related to correlations with the objects by controlling the light receiving part, may measure deformation of skin on the objects based on infrared ray intensity information and infrared ray transmission characteristic change, and may recognize a facial expression of the wearer of the wearable headset device 100 by mapping the deformation of skin to facial expression information stored in the storage unit. For example, the deformation of skin on objects may be display united as two-dimensional or three-dimensional information. For example, at least one object may be disposed between the light emitting part for emitting infrared rays and the light receiving part.

FIGS. 8A and 8B illustrate examples of facial expressions recognized by the wearable headset device according to an embodiment of the present invention. FIG. 8A illustrates examples of facial expressions recognized by obtaining infrared ray information from a whole area of the face by means of another electronic device for recognizing a facial expression, and FIG. 8B illustrates facial expressions recognized by obtaining infrared ray information from areas around the eyes of the user's face by means of the wearable headset device 100.

Referring to FIG. 8A, another electronic device for recognizing a facial expression may sense information from parts corresponding to a whole area of the face of a user, and may recognize a facial expression of the user by comparing the obtained information. A facial expression of a user may be, for example, anger, disgust, fear, joy, sadness, surprise, or the like.

Referring to FIG. 8B, the wearable headset device 100 may measure infrared ray information on areas around the eyes of the user's face using the light emitting part and the light receiving part, and may recognize a facial expression of the user, who wears the wearable headset device 100, by comparing the measured infrared ray information with facial expression information stored in the storage unit.

Comparing FIG. 8A with FIG. 8B, the case in which information on parts corresponding to a whole area of the user's face is sensed by the electronic device for recognizing a facial expression and the case in which infrared ray information on areas around the eyes of the user's face is sensed by the wearable headset device 100 using the light emitting part and the light receiving part may identically recognize facial expressions of the user.

For example, the wearable headset device 100 may recognize a facial expression of a user using infrared ray information measured from areas around the eyes of the face of the user.

For example, the infrared ray information may be measured by means of the wearable headset device 100, at least one light emitting part of which emits infrared rays to areas around the eyes of the user's face and at least one light receiving part of which receives infrared rays related to correlations with the areas around the eyes of the user's face.

For example, the infrared ray information may include intensity information collected from infrared rays related to correlations with areas around the eyes of the user's face, transmission characteristic change determined based on the intensity information by means of the wearable headset device 100, and deformation of skin determined based on the intensity information and the transmission characteristic change.

In accordance with various embodiment of the present invention, since the wearable headset device recognizes a facial expression of a user using an infrared (IR) sensing unit without requiring image capture by means of a camera device, constructional complexity of a wearable headset device, to which a facial expression recognition technology is applied, may be reduced and user convenience may be improved. In addition, the wearable headset device may recognize a facial expression of a user even when the face of the user is covered.

The embodiments disclosed in the claims and the specification of the present invention may be implemented by hardware, software, or a combination of hardware and software.

Such software may be stored in a computer-readable storage unit medium. The computer-readable storage unit medium stores at least one program (software module), i.e., at least one program including instructions for the wearable headset device to execute the method of the present invention when the wearable headset device is driven by at least one processor.

Such software may be stored in a volatile storage unit device, or a non-volatile device such as Read Only Memory (ROM); in memory such as random access memory (RAM), a memory chip, a device, or an integrated circuit; or in an optical or magnetic readable medium such as a Compact Disc-ROM (CD-ROM), a Digital Versatile Disc (DVD), a magnetic disk, or a magnetic tape.

The storage unit devices and storage unit media are examples of machine-readable storage unit means suitable for storing a program(s) which include instructions implementing embodiments when executed. These examples provide a program including code to implement a device or method claimed by one of the claims of the specification, or a machine-readable storage unit medium storing the program. Further, such a program may be electronically transmitted by any medium, such as a communication signal transmitted through wired or wireless connection, and embodiments thereof include equivalents thereof.

In the aforementioned embodiments, constituents of the present invention were expressed in a singular or plural form depending upon embodiments thereof. However, the singular or plural facial expressions should be understood to be suitably selected depending upon a suggested situation for convenience of description, and the aforementioned embodiments should be understood not to be limited to the disclosed singular or plural forms. In other words, it should be understood that plural constituents may be a singular constituent or a singular constituent may be plural constituents.

While the embodiments of the present invention have been described, those skilled in the art will appreciate that many modifications and changes can be made to the present invention without departing from the spirit and essential characteristics of the present invention. Therefore, it should be understood that there is no intent to limit the disclosure to the embodiments disclosed, rather, the disclosure is to cover all modifications, equivalents, and alternatives falling within the spirit and scope of the disclosure as defined by the claims.

DESCRIPTION OF SYMBOLS

100: WEARABLE HEADSET DEVICE
110: COMMUNICATION UNIT
120: STORAGE UNIT
130: SENSING UNIT
132: LIGHT EMITTING PART
134: LIGHT RECEIVING PART
140: DISPLAY UNIT
150: CONTROL UNIT
152: INFORMATION COLLECTION UNIT
154: TRANSMISSION CHARACTERISTIC DETERMINATION UNIT
156: DEFORMATION OF SKIN MEASUREMENT UNIT
158: FACIAL EXPRESSION RECOGNITION UNIT
202: OBJECT

What is claimed is:

1. A wearable headset device for recognizing a facial expression, comprising:
   a storage unit for storing facial expression information;
   at least one light emitting part for emitting infrared rays (IR) to a skin of a face of a user wearing the wearable headset device;
   at least one light receiving part for receiving infrared rays related to a correlation with the skin; and
   a processor,
   wherein the infrared rays (IR) emitted from the at least one light emitting part are radially diffused in a first direction towards inside of the skin, reflected by a fat layer located at a lower part of the skin, and delivered in a second direction and a third direction, the first direction being different from the second direction and the third direction,
   where the at least one light receiving part receives, from the skin, the infrared rays (IR) diffused inside the skin and reflected by the fat layer as diffuse reflection infrared rays (IR),
   wherein the storage unit stores instructions executable by the processor, and
   wherein the processor is configured to:
   collect intensity information from the diffuse reflection infrared rays (IR);
   determine transmission characteristic change in the diffuse reflection infrared rays (IR) by using the intensity information and a distance between the at least one light emitting part and the at least one light receiving part;
   measure deformation of the skin based on the intensity information and the transmission characteristic change in the diffuse reflection infrared rays (IR); and
   recognize a facial expression by comparing the level or magnitude of the deformation of the skin with predetermined reference data of the facial expression.

2. The wearable headset device according to claim 1, wherein the processor is configured to measure deformation of the skin as dilation when the intensity information is greater than a reference value, and measure deformation of the skin as contraction when the intensity information is less than a reference value.

3. The wearable headset device according to claim 1, wherein the deformation of the skin comprises at least one of a contraction degree and a dilation degree of the skin.

4. The wearable headset device according to claim 1, wherein the processor is configured to recognize the facial expression by mapping the deformation of the skin to coordinates of the skin.

5. The wearable headset device according to claim 1, wherein the at least one light emitting part performs one of an operation of emitting sequentially infrared rays to the skin;
   an operation of emitting infrared rays in a group unit to the skin; and
   an operation of emitting simultaneously infrared rays to the skin.

6. The wearable headset device according to claim 1, wherein the correlation comprises one of reflection, diffuse and transmission of the infrared rays by the skin.

7. The wearable headset device according to claim 1, wherein the skin comprises one of an area around a mouth, an area around eyes, and a whole face area of the user wearing the wearable headset device.

8. The wearable headset device according to claim 1, wherein the facial expression information comprises at least one facial expression pattern determined based on at least one of infrared ray intensity information, infrared ray transmission characteristic change, and deformation which are related to the skin.

9. A method of operating a wearable headset device for recognizing a facial expression, the method comprising:
   emitting infrared rays (IR), by at least one light emitting part, to a skin of a face of a user wearing the wearable headset device, the emitted infrared rays (IR) being radially diffused in a first direction towards inside of the skin, reflected by a fat layer locating at a lower part of the skin and delivered in a second direction and a third direction in the skin, the first direction being different from the second direction and the third direction;
   receiving, by at least one light receiving part, from the skin, the diffused and reflected infrared rays (IR) diffused inside the skin and reflected by the fat layer and related to a correlation with the skin as diffuse reflection infrared rays (IR);
   collecting intensity information from the diffuse reflection infrared rays (IR);
   determining transmission characteristic change in the diffuse reflection infrared rays (IR) by using the intensity information and a distance between the at least one light emitting part and the at least one light receiving part;
   measuring deformation of the skin based on the intensity information and the transmission characteristic change in the diffuse reflection infrared rays (IR); and
   recognizing a facial expression by comparing the level or magnitude of the deformation of the skin with predetermined reference data of the facial expression.

10. The method according to claim 9, wherein the measuring comprises:
   measuring deformation of the skin as dilation when the intensity information is greater than a reference value; and
   measuring deformation of the skin as contraction when the intensity information is less than a reference value.

11. The method according to claim 9, wherein the deformation of the skin comprises at least one of a contraction degree and a dilation degree of the skin.

12. The method according to claim 9, wherein the recognizing comprises recognizing the facial expression by mapping the deformation of the skin to coordinates of the skin.

13. The method according to claim 9, wherein the emitting comprises:
   emitting sequentially infrared rays to the skin;
   emitting infrared rays in a group unit to the skin; and
   emitting simultaneously infrared rays to the skin.

14. The method according to claim 9, wherein the correlation comprises one of reflection, diffuse and transmission of the infrared rays by the skin.

15. The method according to claim 9, wherein the skin comprises one of an area around a mouth, an area around eyes, and a whole face area of the user wearing the wearable headset device.

16. The method according to claim 9, wherein the facial expression information comprises at least one facial expression pattern determined based on at least one of infrared ray intensity information, infrared ray transmission characteristic change, and deformation which are related to the skin.

\* \* \* \* \*